(12) United States Patent
Yang (10) Patent No.: US 12,375,818 B2
(45) Date of Patent: Jul. 29, 2025

(54) IMAGE CAPTURING METHOD AND APPARATUS, DEVICE AND STORAGE MEDIUM

(71) Applicant: Lenovo (Beijing) Limited, Beijing (CN)

(72) Inventor: Shuangxin Yang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 207 days.

(21) Appl. No.: 18/122,564

(22) Filed: Mar. 16, 2023

(65) Prior Publication Data
US 2024/0007753 A1    Jan. 4, 2024

(30) Foreign Application Priority Data
Jun. 30, 2022   (CN) .......................... 202210772220.0

(51) Int. Cl.
*H04N 23/73*    (2023.01)
*G06T 7/20*     (2017.01)
*G06V 10/74*    (2022.01)
*H04N 23/63*    (2023.01)

(52) U.S. Cl.
CPC ............... *H04N 23/73* (2023.01); *G06T 7/20* (2013.01); *G06V 10/761* (2022.01); *H04N 23/632* (2023.01)

(58) Field of Classification Search
CPC .. H04N 23/73; H04N 23/632; H04N 23/6811; H04N 23/743; H04N 23/951; H04N 25/134; H04N 23/676; G06T 7/20; G06T 5/50; G06V 10/761
See application file for complete search history.

(56) References Cited

U.S. PATENT DOCUMENTS

| | | | |
|---|---|---|---|
| 2006/0114340 A1* | 6/2006 | Sakurai | H04N 23/63 348/E5.046 |
| 2023/0388655 A1* | 11/2023 | Yin | H04N 25/10 |

\* cited by examiner

*Primary Examiner* — Lin Ye
*Assistant Examiner* — Tuan H Le
(74) *Attorney, Agent, or Firm* — ANOVA LAW GROUP, PLLC (57) ABSTRACT

An image capturing method includes: in response to an obtained shooting command, determining a target image frame corresponding to a moment when the shooting command is obtained in a buffer queue; and saving the target image frame as a photo. The buffer queue includes images frames obtained at different moments with different exposures. A plurality of image frames obtained at a same moment with a same exposure are respectively located in different buffer queues. Values of target acquisition parameters of the plurality of image frames obtained at the same moment are different.

19 Claims, 6 Drawing Sheets

In response to an obtained shooting commend, determining and obtaining a target image frame corresponding to a moment when the shooting command is obtained in a buffer queue — S102

Saving the target image frame as a photo, the buffer queue including image frames obtained at different moments with different exposures, a plurality of image frames obtained at a same moment with a same exposure being respectively located in different buffer queues, and values of target acquisition parameters of the plurality of image frames obtained at the same moment being different. — S104

IMAGE CAPTURING METHOD AND APPARATUS, DEVICE AND STORAGE MEDIUM

CROSS-REFERENCE TO RELATED APPLICATION

This application claims priority to Chinese Patent Application No. 202210772220.0, filed on Jun. 30, 2022, the entire content of which is incorporated herein by reference.

TECHNICAL FIELD

The present disclosure relates to the technical field of electronics technology and, more particularly, to an image capturing method and apparatus, a device, and a storage medium.

BACKGROUND

Mobile phone users often need to capture images of moving subjects. The most effective way to capture the images clearly is to shorten the shutter time, that is, increase the shutter speed. The camera's exposure strategy is mostly based on light intensity. A long shutter time for the moving subjects would blur the subjects in the photos.

Subjects are often photographed in a non-zero latency photo mode or a zero latency photo mode. In the non-zero latency photo mode, a photo is captured only after pressing the camera button for a certain period of time, which easily leads to missing wonderful moments. In the zero latency photo mode, when the shutter button is pressed, a photo in a zero latency queue would be taken according to the previous exposure time, the photo will still be taken according to an old shutter speed, and motion blur may occur.

SUMMARY

One aspect of the present disclosure provides an image capturing method. The image capturing method includes: in response to an obtained shooting command, determining a target image frame corresponding to a moment when the shooting command is obtained in a buffer queue; and saving the target image frame as a photo. The buffer queue includes images frames obtained at different moments with different exposures. A plurality of image frames obtained at a same moment with a same exposure are respectively located in different buffer queues. Values of target acquisition parameters of the plurality of image frames obtained at the same moment are different.

Another aspect of the present disclosure provides an image capturing apparatus. The image capturing apparatus includes a memory storing program instructions and a processor coupled to the memory. When being executed by the processor, the program instructions cause the processor to: in response to an obtained shooting command, determine a target image frame corresponding to a moment when the shooting command is obtained in a buffer queue; and save the target image frame as a photo. The buffer queue includes images frames obtained at different moments with different exposures. A plurality of image frames obtained at a same moment with a same exposure are respectively located in different buffer queues. Values of target acquisition parameters of the plurality of image frames obtained at the same moment are different.

Another aspect of the present disclosure provides a computer-readable storage medium storing a computer program. When being executed by a processor, the computer program causes the processor to: in response to an obtained shooting command, determine a target image frame corresponding to a moment when the shooting command is obtained in a buffer queue; and save the target image frame as a photo. The buffer queue includes images frames obtained at different moments with different exposures. A plurality of image frames obtained at a same moment with a same exposure are respectively located in different buffer queues. Values of target acquisition parameters of the plurality of image frames obtained at the same moment are different.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

The technical solutions of the present disclosure are described in detail below with the accompanying drawings.

Figure 1:
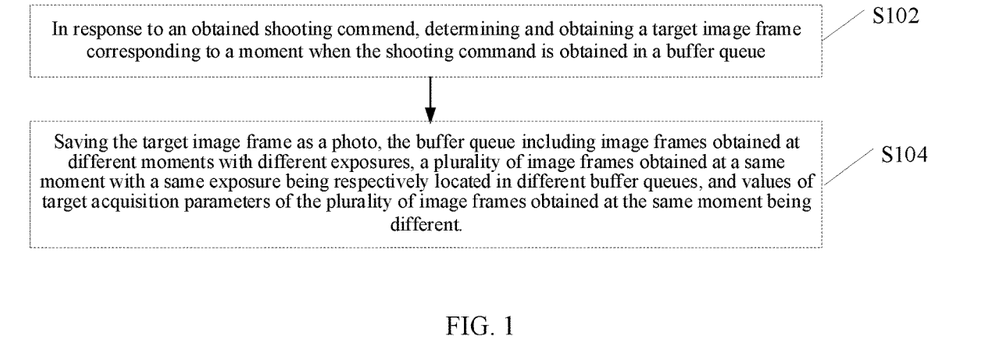
FIG. 1 is a flowchart of an exemplary image capturing method according to some embodiments of the present disclosure.

FIG. 1 is a flowchart of an exemplary image capturing method according to some embodiments of the present disclosure. The image capturing method can be applied to an electronic device. As shown in FIG. 1, the image capturing method includes the following processes.

At S102, in response to an obtained shooting command, a target image frame corresponding to a time of a shooting command is determined and obtained in a buffer queue.

The shooting command may be a command generated according to a photographing operation by a user. The photographing operation may be an operation that the user presses a photographing button. The user often needs to take a photo of a subject in motion. If a non-zero latency photo mode is used to take the photo, the photo is generated only after the user presses the photographing button for a certain time, which often leads to missing a wonderful moment. To capture the images of the wonderful moment, the user may choose the zero latency photo mode. The zero latency photo mode refers to generating the photo at the moment when the photographing button is pressed. That is, the generated photo is the target image frame obtained in the buffer queue corresponding to the time of the shooting command.

At S104, the target image frame is saved as a photo.

The buffer queue includes image frames obtained at different moments with different exposures. A plurality of image frames obtained at a same moment with a same exposure may be respectively located in different buffer queues. Values of target acquisition parameters of the plurality of image frames obtained at the same moment are different. When a photographed subject is in motion and a camera of the electronic device is relatively stationary, the exposures at different moments may be different due to the photographed subject in motion. That is, the exposure changes as the photographed subject moves in front of the camera. The photographed subject obtained at the same moment but located in different buffer queues may have the same action and exposure, but may have different values of the target acquisition parameter. The photographed subject obtained at different moments but located in the same buffer queue may have different actions and different exposures.

Figure 2:
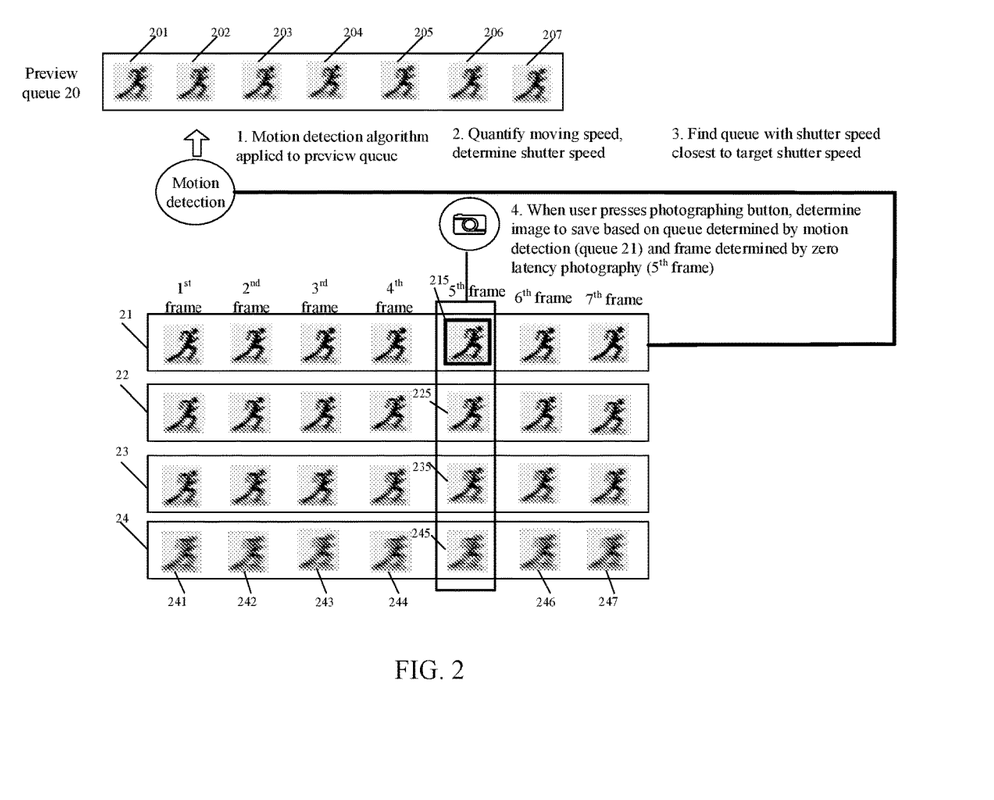
FIG. 2 is a schematic diagram of an exemplary buffer queue according to some embodiments of the present disclosure.

FIG. 2 is a schematic diagram of an exemplary buffer queue according to some embodiments of the present disclosure. As shown in FIG. 2, at the same moment, four image frames (e.g., image frame 215, image frame 225, image frame 235, and image frame 245) are generated with the same exposure based on different values of the target acquisition parameter, and four buffer queues (e.g., a first buffer queue 21, a second buffer queue 22, a third buffer queue 223, and a fourth buffer queue 24) are generated at seven different moments. The image frames in the buffer queues may be continuously updated. Newly generated image frames are constantly inserted to a rear end of each buffer queue, and old image frames are constantly deleted from a front end of each buffer queue. Each buffer queues holds seven image frames from a first image frame to a seventh image frame. As shown in FIG. 2, a leftmost image frame (i.e., the first image frame) in each buffer queue corresponds to an earliest timestamp, and a rightmost image frame (i.e., the seventh image frame) corresponds to a latest timestamp.

For illustration purpose, the present disclosure is further described using all the image frames in the fourth buffer queue 24. The first image frame 241 through the seventh image frame 247 in the fourth buffer queue are image frames obtained at different moments with different exposures. The first image frame is generated earliest and the seventh image frame is generated latest. For illustration purpose, the present disclosure is further described using the fifth image frame 215 in all the buffer queues. The image frame 215 and the image frame 245 are image frames in different buffer queues and obtained at the same moment with the same exposure. Because the image frame 215 and the image frame 245 have different target acquisition parameters, blurriness and noise of the two images are different. Different target acquisition parameters are suitable for different photographing scenes, such as a moving scene or a stationary scene.

In some embodiments, by using the image frame corresponding to the moment when the shooting command is obtained as the photo, the wonderful moment that the user wishes to keep can be preserved. Because the target acquisition parameters of the image frames in different buffer queues and obtained at the same moment are different, options and diversity of the image frames are improved.

In some embodiments, the target acquisition parameters of multiple image frames obtained at the same moment include at least one of the following: a shutter speed or a sensitivity (i.e., an International Standards Organization or ISO value). The shutter speed may also be referred to as a shutter time. The shutter time may be ¹⁄₂₄₀ s (i.e., in the unit of second), ¹⁄₁₂₀ s, ¹⁄₆₀ s, ¹⁄₃₀ s, ¹⁄₁₅ s, and ¹⁄₁₀ s, etc. The shorter the shutter time, the faster the shutter speed. ISO may be 200 (i.e., in the unit of American Standards Associations scale or ASA scale), 100, 50, 25, 10, and 8, etc.

When an aperture is fixed and the exposure remain the same, the shorter the shutter time is, the higher the sensitivity will be. A resulting image will have less motion blur but higher noise. On the other hand, the longer the shutter time (that is, the slower the shutter speed), the lower the sensitivity, the more blurred the resulting image, but the lower the noise. The faster shutter speed and higher sensitivity are suitable for photographing moving scenes, and the slower shutter speed and lower sensitivity are suitable for photographing stationary scenes. As shown in FIG. 2, among the image frame 215 through the image frame 245, the image frame 215 has the fastest shutter speed, the highest sensitivity, the clearest image quality, and the highest noise. The image frame 245 has the slowest shutter speed, the lowest sensitivity, the most blurred image quality, and the lowest noise.

In some embodiments, the plurality of image frames obtained by a camera module at the same moment with the same exposure are. The camera module includes an image sensor. A photosensitive array of the image sensor includes a plurality of pixel groups. Pixel units in each pixel group sense light of a same color. Each pixel group includes a plurality of pixel units. Adjacent pixel groups sense light of different colors.

Figure 3:
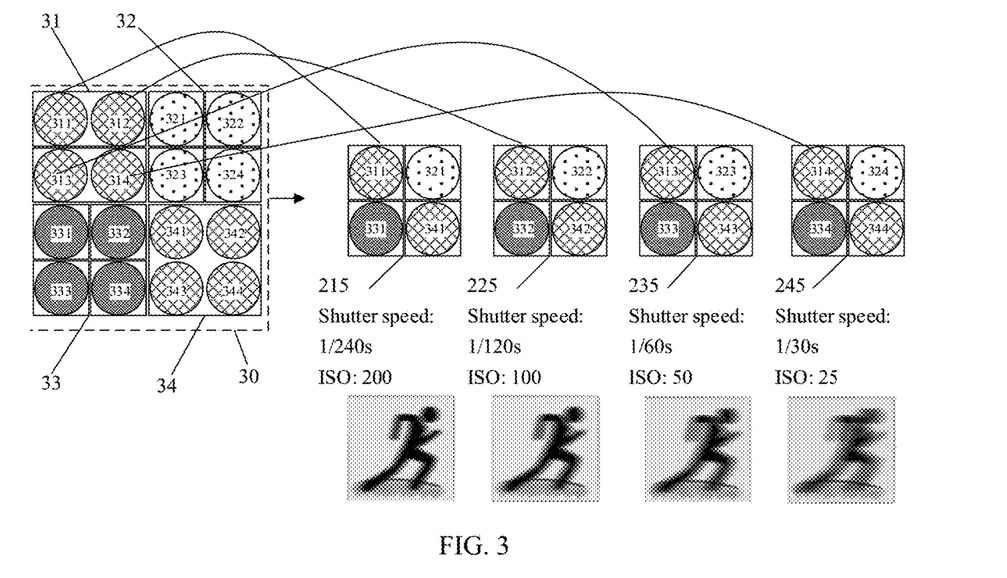
FIG. 3 is a schematic diagram of display effects of image frames corresponding to different target acquisition parameters at a same moment according to some embodiments of the present disclosure.

As shown in FIG. 3, the image sensor may be a 4-in-1 sensor, and a photosensitive array 30 of the 4-in-1 sensor may include four pixel groups: a first pixel group 31, a second pixel group 32, a third pixel group 33, and a fourth pixel group 34. The first pixel group 31 and the second pixel group 32 are adjacent to each other and sense light of different colors. The first pixel group 31 and the third pixel group 33 are also adjacent to each other, and sense light of different colors. For example, the pixel units of the first pixel group 31 all sense a green light. The pixel units of the second pixel group 32 all sense a red light. The pixel units of the third pixel group 33 all sense a blue light. The pixel units of the fourth pixel group 34 all sense the green light.

The first pixel group 31 may include a first pixel unit 311 through a fourth pixel unit 314. The second pixel group 32 may include a first pixel unit 321 through a fourth pixel unit 324. The third pixel group 33 may include a first pixel unit 331 through a fourth pixel unit 334. The fourth pixel group 34 may include a first pixel unit 341 through a fourth pixel unit 344.

In some embodiments, each of the plurality of image frames obtained at the same moment with the same exposure is generated using photosensitive data of corresponding pixel units in the plurality of pixel groups in the photosensitive array.

As shown in FIG. 3, each image frame in the image frame 215 through the image frame 245 obtained at the same moment with the same exposure may be generated using the photosensitive data of one pixel unit in each of the plurality of pixel groups. The image frame 215 may be generated using the photosensitive data of the first pixel unit 311 of the first pixel group 31, the first pixel unit 321 of the second pixel group 32, the first pixel unit 331 of the third pixel group 33, and the first pixel unit 341 of the fourth pixel group 34. Similarly, the image frame 225 may generated using the photosensitive data of the second pixel unit 312 of the first pixel group 31, the second pixel unit 322 of the second pixel group 32, the second pixel unit 332 of the third pixel group 33, and the second pixel unit 332 of the fourth pixel group 34. The image frame 235 may be generated using the photosensitive data of the third pixel unit 313 of the first pixel group 31, the third pixel unit 323 of the second pixel group 32, the third pixel unit 333 of the third pixel group 33, and the third pixel unit 343 of the fourth pixel group 34. The image frame 245 may be generated using the photosensitive data of the fourth pixel unit 314 of the first pixel group 31, the fourth pixel unit 324 of the second pixel group 32, the fourth pixel unit 334 of the third pixel group 33, and the fourth pixel unit 344 of the fourth pixel group 34. The entire photosensitive array 30 may obtain the photosensitive data at one time and then divide the photosensitive data into the image frame 215 through the image frame 245, such that the exposure can be the same at the same moment. The number of image frames that can be generated using the image sensor is the same as the number of pixel units in one pixel group.

As shown in FIG. 3, the shutter speed corresponding to the image frame 215 may be 1/240 second, the sensitivity is 200, and a portrait subject in the image frame is clear. The shutter speed corresponding to the image frame 225 may be 1/120 second, and the sensitivity is 100. The shutter speed corresponding to the image frame 235 may be 1/60 second, and the sensitivity is 50. The shutter speed corresponding to the image frame 245 may be 1/30 second, and the sensitivity is 25. At this time, the portrait subject in the image frame is blurred.

In the above-described exposure method (i.e., fixed aperture and same exposure), the 4-in-1 image sensor may generate 4 image frames with different combinations of shutter speeds and sensitivities for each exposure. Multiple exposures may generate images in four zero latency queues (i.e., buffer queue 21 through buffer queue 24) as shown in FIG. 2.

Similarly, the image sensor may also be a 9-in-1 image sensor. Each pixel group in the photosensitive array of the 9-in-1 image sensor includes 9 pixel units. The 9-in-1 image sensor generates 9 different image frames with different combinations of the shutter speeds and the sensitivities for each exposure, and generates nine buffer queues for multiple exposures. The image sensor may also be a 16-in-1 image sensor, or a 25-in-1 image sensor, etc. Accordingly, 16 buffer queues or 25 buffer queues may be generated through multiple exposures.

In some other embodiments, the electronic device further includes a plurality of cameras. Each camera includes an image sensor. The photosensitive array of each image sensor includes a plurality of pixel units, such as 4, 9, 16, or 25 pixel units. When the aperture is fixed and the exposure is the same, the image sensor of each camera generates the number of image frames with a combination of different shutter speeds and different sensitivities that is equal to the number of pixel units for each exposure. For example, each camera includes nine pixel units, and nine image frames with a combination of different shutter speeds and different sensitivities can be generated.

In some embodiments, the multiple buffer queues include a reference queue. The value of the reference acquisition parameter is determined based on an exposure time and a mapping relationship at different moments in the reference queue. The values of the target acquisition parameters at the same moment in the multiple buffer queues may be determined based on the value of the reference acquisition parameter.

Figure 4:
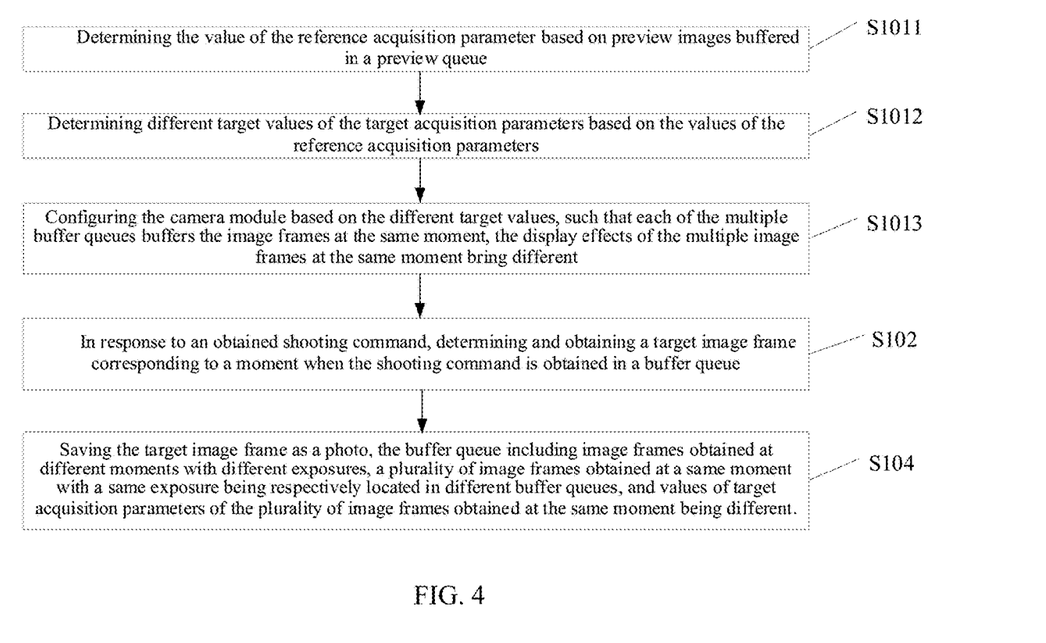
FIG. 4 is a flowchart of another exemplary image capturing method according to some embodiments of the present disclosure.

As shown in FIG. 4, before S102 "determining and obtaining the target image frame corresponding to the time of the shooting command in the buffer queue in response to the obtained shooting command", the method provided by the present disclosure further includes the following processes.

At S1011, the value of the reference acquisition parameter is determined based on preview images buffered in a preview queue. The reference acquisition parameter may include a reference shutter speed and/or a reference sensitivity. The mapping relationship between the exposure time and the reference acquisition parameter may be stored in advance in a data table. The reference shutter speed and/or the reference sensitivity at the corresponding time may be determined by using a look-up table method based on the exposure time of a preview image buffered in the preview queue.

At S1012, different target values of the target acquisition parameters are determined based on the values of the reference acquisition parameters.

The target acquisition parameter may be obtained through the reference acquisition parameter and a pre-configured coefficient. For example, the target acquisition parameter may be obtained by multiplying the reference acquisition parameter with the pre-configured coefficient, or by dividing the reference acquisition parameter by the pre-configured coefficient. Both the reference acquisition parameter and the pre-configured coefficient may be adjusted. In some embodiments, the reference shutter speed is 1/30 second, the reference sensitivity is 25, and the pre-configured coefficient is 2, then the different target values of the target acquisition parameters may be the target shutter time 1/30 second and the target sensitivity 25, the target shutter time 1/60 second and the target sensitivity 50, the target shutter time 1/120 second and the target sensitivity 100, and the target shutter time 1/240 sec and the target sensitivity 200.

In some embodiments, the pre-configured coefficient may be 1.5, 2.5, or 4, etc. The reference shutter speed may be 1/10 second, 1/15 second, or 1/20 second, etc. The reference sensitivity may be 5, 8, or 10, etc.

At S1013, the camera module is configured based on the different target values, such that each of the multiple buffer queues buffers the image frames at the same moment. The display effects of the multiple image frames at the same moment are different.

Different photographed objects may move at different speeds. Different shutter speeds and different sensitivities are required to clearly capture images of different objects moving at different speeds. The faster the moving speed, the faster the shutter speed, and the higher the sensitivity, the clearer the photo. By configuring the camera module with different target values, the camera module may be adapted to different motion scenes of the photographed objects. As shown in FIG. 3, at a certain moment, the camera module can be configured based on different target values, thereby generating the image frame 215 through the image frame 245. As shown in FIG. 2, the image frame 215 through the image frame 245 are respectively buffered in the 5th image frames in the first buffer queue 21 through the fourth buffer queue 24. Similarly, image frames generated at other times may also be buffered, thereby obtaining multiple buffer queues. As shown in FIG. 2, the fourth buffer queue 24 may be the reference queue generated based on the reference acquisition parameter.

In some embodiments, by determining different target values of the target acquisition parameters based on the values of the reference acquisition parameters, the target values of the target acquisition parameters can be determined more accurately and efficiently. By configuring the camera module based on different target values, the multiple buffer queues have different display effects of image frames at the same moment. Thus, different exposure settings for pixels can be implemented to meet photographing needs of different scenes.

Figure 5:
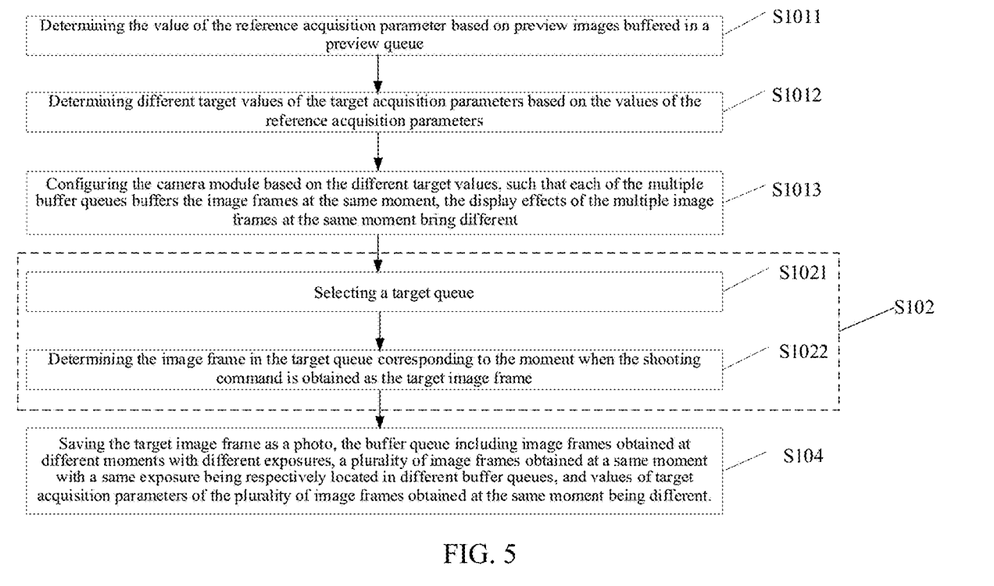
FIG. 5 is a flowchart of another exemplary image capturing method according to some embodiments of the present disclosure.

In some embodiments, as shown in FIG. 5, S102 "determining and obtaining the target image frame corresponding to the time of the shooting command in the buffer queue in response to the obtained shooting command" may include the following processes.

At S1021, a target queue is selected.

As shown in FIG. 2, a motion detection algorithm may be used to process the preview image of the preview queue. That is, when the user presses the photographing button, the motion detection algorithm is used to process the preview image 201 through the preview image 207 buffered in the preview queue 20 in response to the obtained shooting command. The moving speed of the photographed object is quantified. Based on the moving speed of the photographed object, the shutter speed and/or the sensitivity closest to the target shutter speed and/or the target sensitivity are searched in the first buffer queue 21 through the fourth buffer queue 24, and the queue corresponding to the shutter speed and/or the sensitivity closest to the target shutter speed and/or the target sensitivity is determined as the target queue. For example, the first buffer queue 21 may be determined as the target queue. The display effect of the target image frame in the target queue is better than that of the preview image at the same moment in the preview queue. An action of the target object in the target image frame in the target queue is the same as an action of the target object in the preview image at the same moment in the preview queue. Because the resolution of the preview image in the preview queue is low, an efficiency of determining the target shutter speed and/or the target sensitivity is substantially high, which in turn improves an efficiency of determining the target queue. Because the shutter speed and/or the sensitivity corresponding to the target queue are closest to the target shutter speed and/or the target sensitivity, the photo frame is sharper than other image frames in the buffer queues.

At S1022, the image frame in the target queue corresponding to the moment when the shooting command is obtained is determined as the target image frame.

As shown in FIG. 2, the image frame 215 in the first buffer queue 21 corresponding to the moment when the shooting command is obtained (i.e., the fifth image frame in the first buffer queue 21) may be determined as the target image frame to be saved.

In some embodiments, the target queue with a suitable combination of the shutter speed and the sensitivity is determined based on a motion state of the photographed object. The image frame corresponding to the moment when the shooting command is obtained is determined in the target queue. Thus, the display effect of the photographed object is improved, the photographed object is displayed more clearly, and the photo satisfies the user's need.

In some other embodiments, S102 "determining and obtaining the target image frame corresponding to the time of the shooting command in the buffer queue in response to the obtained shooting command" may include the following processes.

At S1021': at least one image frame corresponding to the moment when the shooting command is obtained is determined in the buffer queue;

As shown in FIG. 2, at least one image frame from the image frame 215 to the image frame 245 corresponding to the moment when the shooting command is obtained may be determined.

At S1022', the image frame in the target queue among the at least one image frame is determined as the target image frame.

As shown in FIG. 2, the motion detection algorithm is used to determine the moving speed of the photographed object. The buffer queue 21 corresponding to the combination of the target shutter speed and the target sensitivity corresponding to the moving speed in the buffer queue is determined as the target queue. The image frame 215 in the target queue 21 is determined as the target image frame.

In some embodiments, an image frame set corresponding to the moment when the obtained shooting command is determined in the buffer queue. The target queue with a suitable combination of the shutter speed and the sensitivity is determined based on the motion state of the photographed object. The image frame in the image frame set in the target queue is determined as the target image frame. Thus, the display effect of the photographed object is improved, the photographed object is displayed more clearly, and the photo satisfies the user's need.

Figure 6:
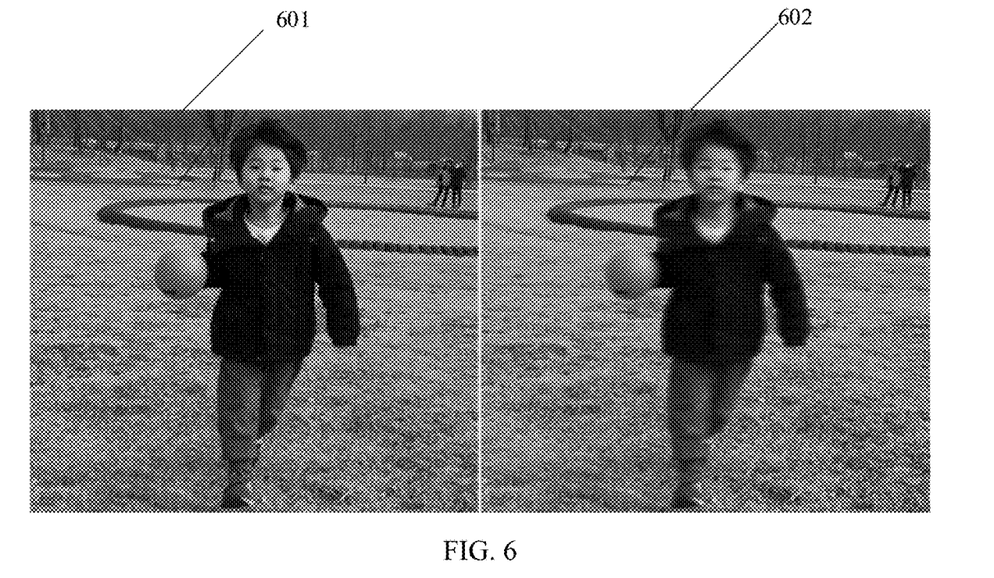
FIG. 6 is a schematic diagram of display effects of image frames corresponding to different shutter speeds according to some embodiments of the present disclosure.

In the related art, mobile phone users often want to capture moving subjects, and the most effective way to clearly capture the moving subjects is to shorten the shutter time, that is, to increase the shutter speed. Because the exposure strategy of the camera is mostly formulated according to the light intensity, the long shutter time for the moving subjects may cause the subject to be blurred in the photo. As shown in FIG. 6, when the shutter time is short (i.e., the shutter speed is fast), the subject in the image frame 602 is clear. When the shutter time is long (i.e., the shutter speed is slow), the subject in the image frame 602 is blurred.

Figure 7:
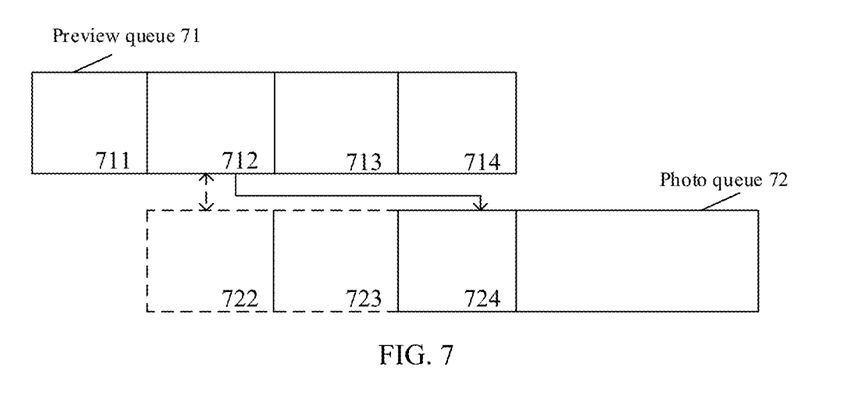
FIG. 7 is a schematic diagram of an image capturing method in the related art.

In the related art, the motion detection algorithm and the non-zero latency photography may be used to generate photos. As shown in FIG. 7, the motion detection algorithm is used for motion detection during the camera preview. The motion detection algorithm quantifies the moving speed of the subject and determines a suitable shutter time. When the user presses the photographing button (the corresponding image frame is the image frame 712 in the preview queue 71), the preview is stopped. A new shutter time is determined based on motion detection result and is configured to the image sensor to generate a photo.

However, in the non-zero latency photo mode, the photo (such as the image frame 724 in the photo queue 72) can only be generated after the photographing button is pressed for a certain time, which easily leads to missing wonderful moments (i.e., the image frame 712).

In the related art, the motion detection algorithm and the zero latency photography may also be used to generate the photos. As shown in FIG. 7, the motion detection is performed using the motion detection algorithm during the camera preview. The motion detection algorithm quantifies the moving speed of the subject and determines the suitable shutter time. The new shutter time determined based on the motion detection result is configured to the image sensor in real time to generate new photos and update the zero latency queue. When the photographing button is pressed (the corresponding image frame is the image frame 712 in the preview queue 71), the corresponding image frame (i.e., the image frame 722) in the zero latency queue is saved according to a zero latency principle.

However, if the image frame in the zero latency queue has not been updated according to the new exposure moment when a shutter button (i.e., the photographing button) is pressed, the resulting image frame may still be generated according to the old shutter time (that is, the old shutter speed), and motion blur may occur. That is, if the shutter button is pressed at the beginning of motion, it is easy to take a photo with motion blur, that is, the image frame 722 is relatively blurred.

Figure 8:
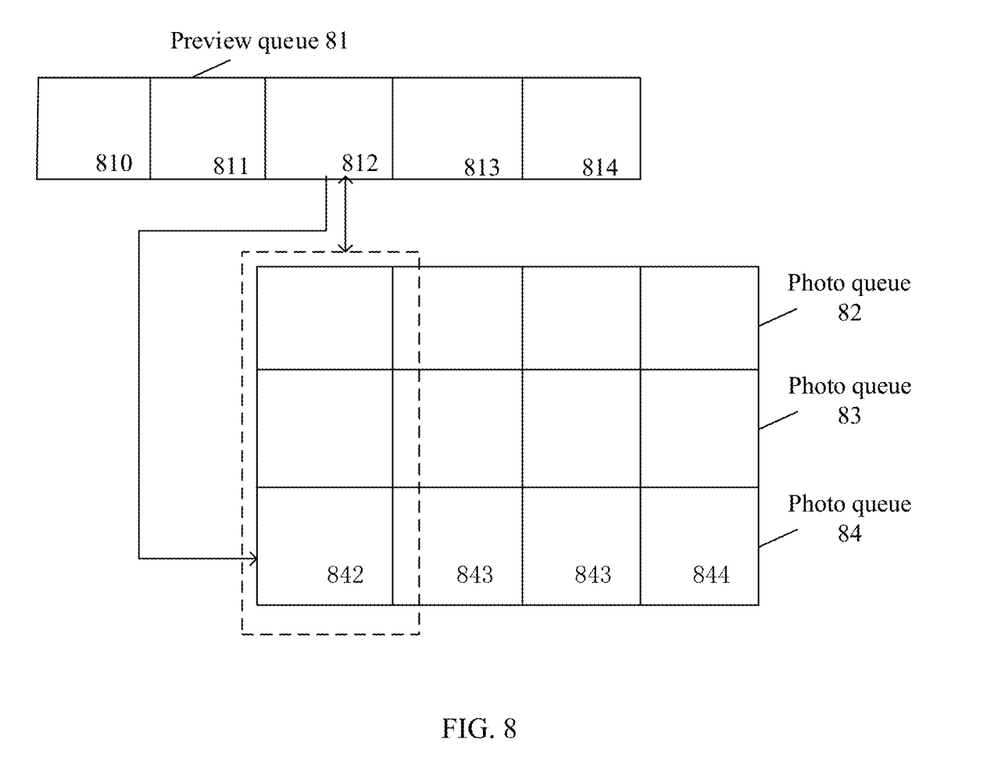
FIG. 8 is a flowchart of another exemplary image capturing method according to some embodiments of the present disclosure.

In some embodiments, as shown in FIG. 8, when the aperture is fixed and the exposure is the same, the image sensor may generate image frames with different shutter speeds and different sensitivities for each exposure. The image sensor may generate four photo queues 82 to 84 for multiple exposures. When the shutter button is pressed (the corresponding image frame is the image frame 812 in the preview queue 81), the suitable queue is determined to be 84 through the motion detection algorithm. The corresponding frame (i.e., image frame 842) is determined based on the zero latency principle and the image frame 842 is saved as the photo.

In some embodiments, the photos in different photo queues are all generated based on different shutter speeds. When the shutter button is pressed, the photo queue corresponding to the suitable shutter speed is determined. A clear image can be saved at the moment (zero latency) when the shutter button is pressed. A problem of blurred images caused by untimely shutter speed changes may be avoided.

Figure 9:
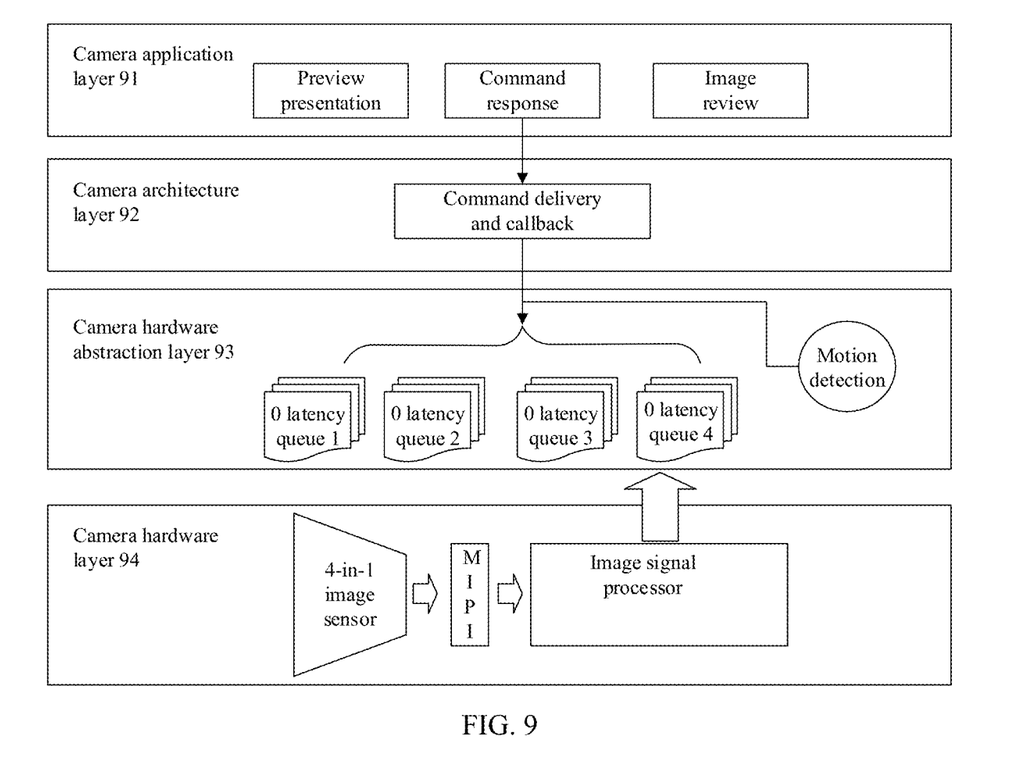
FIG. 9 is a schematic diagram of an operation principle of capturing an image according to some embodiments of the present disclosure.

FIG. 9 is a schematic diagram of an operation principle of capturing an image according to some embodiments of the present disclosure. As shown in FIG. 9, the camera provided in the embodiments of the present disclosure includes a camera application layer 91, a camera architecture layer 92, a camera hardware abstraction layer 93, and a camera hardware layer 94. The camera application layer 91 supports preview presentation of photos, response to a user command (generating the shooting command in response to the user command), and image review function. The camera architecture layer 92 supports command delivery and callback, and passes the shooting command to the camera hardware abstraction layer 93. The camera hardware abstraction layer 93 generates the zero latency queue based on the motion detection algorithm and the zero latency photography in response to the shooting command. The camera hardware layer 94 provides the 4-in-1 image sensor, a mobile industry processor interface (MIPI), and an image signal processor (ISP) to generate the zero latency queue.

In some embodiments, if the above-described image capturing method is implemented in the form of a software function module and sold or used as a standalone product, the image capturing method may also be stored in a computer-readable storage medium. Based on this understanding, the technical solutions of the embodiments of the present disclosure or the part that contributes to the related art may be embodied in the form of a computer software product. The computer software product is stored in a storage medium and includes a plurality of program instructions to cause an electronic device (which may be a mobile phone, a tablet computer, a desktop computer, a personal digital assistant, a navigator, a digital phone, a video phone, a TV, a sensor device, etc.) to execute all or part of the methods described in various embodiments of the present disclosure. The storage medium includes: a U disk, a mobile hard disk, a read-only memory (ROM), a magnetic disk or an optical disk, and other media capable of storing program codes. Thus, the embodiments of the present disclosure are not limited to any specific combination of hardware and software.

Based on the above-described embodiments, the present disclosure also provides an image capturing apparatus. The image capturing apparatus includes various modules implemented by a processor thereof. The image capturing apparatus may also be implemented by logic circuits. During the implementation process, the processor may be a central processing unit (CPU), a microprocessor unit (MPU), a digital signal processor (DSP), or a field programmable gate array (FPGA), etc.

Figure 10:
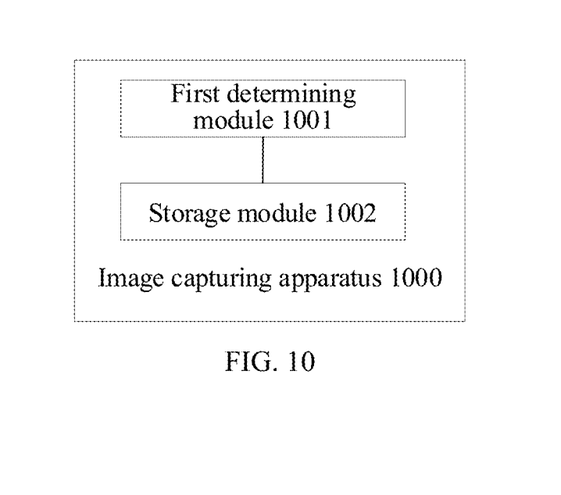
FIG. 10 is a schematic structural diagram of an exemplary image capturing apparatus according to some embodiments of the present disclosure.

FIG. 10 is a schematic structural diagram of an exemplary image capturing apparatus according to some embodiments of the present disclosure. As shown in FIG. 10, the image capturing apparatus 1000 includes a first determining module 1001 configured to, in response to the obtained shooting command, determine in the buffer queue the target image frame corresponding to the moment when the shooting command is obtained, and a storage module 1002 configured to save the target image frame as the photo.

The buffer queue includes image frames obtained at different moments with different exposures. The multiple image frames obtained with the same exposure at the same moment are respectively located in different buffer queues. The values of the target acquisition parameters of the multiple image frames at the same moment are different.

In some embodiments, the multiple image frames are obtained by one camera module at the same moment with the same exposure. The camera module includes the image sensor. The photosensitive array of the image sensor includes multiple pixel groups. The pixel units of each pixel group sense light of the same color. Each pixel group includes a plurality of pixel units. Adjacent pixel groups sense light of different colors.

In some embodiments, each of the plurality of image frames obtained at the same moment with the same exposure is generated by the photosensitive data of the corresponding pixel unit in the plurality of pixel groups in the photosensitive array.

In some embodiments, the target acquisition parameters of the plurality of image frames at the same moment include at least one of the following: the shutter speed or the sensitivity.

In some embodiments, the multiple buffer queues include the reference queue. The value of the reference acquisition parameter is determined based on the exposure time and the mapping relationship at different moments in the reference queue. The values of the target acquisition parameters at the same moment in the multiple buffer queues are determined based on the value of the reference acquisition parameter. The image capturing apparatus further includes: a second determination module configured to determine the value of the reference acquisition parameter based on the preview image buffered in the preview queue; a third determination module configured to determine different target values of the target acquisition parameters based on the value of the reference acquisition parameter; and a configuration module configured to configure the camera module based on the different target values, such that each of the multiple buffer queues buffers the image frames at the same moment. The display effects of the multiple image frames at the same moment are different.

In some embodiments, the first determination module 1001 includes: a selection submodule configured to select the target queue; a determination submodule configured to determine the image frame in the target queue corresponding to the moment when the shooting command is obtained as the target image frame.

In some embodiments, the display effect of the target image frame in the target queue is better than that of the preview image at the same moment in the preview queue. The action of the target object in the target image frame in the target queue is the same as the action of the target object in the preview image at the same moment in the preview queue.

The description of the apparatus embodiment is similar to the description of the method embodiment, and has similar beneficial effects as the method embodiment. For technical details not disclosed in the apparatus embodiments of the present disclosure, reference can be made to the description of the method embodiments of the present disclosure for understanding.

Figure 11:
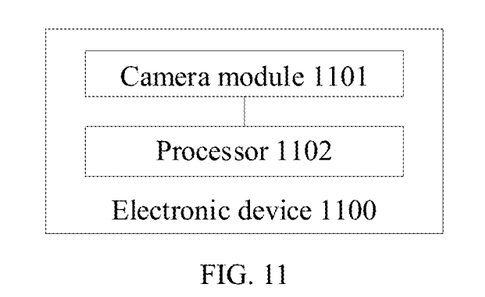
FIG. 11 is a schematic diagram of hardware components of an exemplary electronic device according to some embodiments of the present disclosure.

Correspondingly, the present disclosure provides an electronic device. FIG. 11 is a schematic diagram of hardware components of an exemplary electronic device according to some embodiments of the present disclosure. As shown in FIG. 11, the electronic device 1100 includes hardware components such as a camera module configured to generate a plurality of image frames based on the values of different target acquisition parameters, and a processor configured to implement the processes in the image capturing method provided by the embodiments of the present disclosure.

Correspondingly, the present disclosure also provides a computer-readable storage medium on which a computer program is stored, and when the computer program is executed by a processor, the processes in the image capturing method provided by the embodiments of the present disclosure are implemented.

It should be noted that the descriptions of the storage medium and electronic device embodiments are similar to the descriptions of the method embodiments, and have similar beneficial effects to those of the apparatus embodiments. For technical details not disclosed in the storage medium and method embodiments of the present disclosure, reference can be made to the description of the apparatus embodiments of the present disclosure for understanding.

In some embodiments, unless otherwise defined, the technical terms or scientific terms used in the description of the embodiments of the present disclosure should have the usual meanings understood by those skilled in the art to which the embodiments of the present disclosure belong. "first\second" and similar words used in the embodiments of the present disclosure do not indicate any order, quantity or importance, but are only used to distinguish similar components.

Those skilled in the art should understand that unless otherwise defined, all terms (including technical terms and scientific terms) used herein have the same meanings as those of ordinary skill in the art to which the embodiments of the present disclosure belong. It should also be understood that terms, such as those defined in commonly used dictionaries, should be understood to have meanings consistent with their meaning in the context of the prior art, and unless specifically defined as herein, are not intended to be idealized or overly formalized.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not mean the order of execution, which should be determined by its functions and internal logic, and should not constitutes any limitation on the implementation in the embodiments of the present disclosure. The sequence numbers of the above embodiments of the present disclosure are for description only, and do not represent the advantages and disadvantages of the embodiments.

It should be noted that, in the specification, the term "comprising", "including" or any other variation thereof is intended to cover a non-exclusive inclusion such that a process, method, article, or apparatus comprising a set of elements includes not only those elements, but also includes other elements not expressly listed, or elements inherent in the process, method, article, or device. Without further limitations, an element defined by the phrase "comprising a . . . " does not preclude the presence of additional identical elements in the process, method, article, or apparatus comprising that element.

In the embodiments of the present disclosure, it should be understood that the disclosed devices and methods may be implemented in other ways. The device embodiments described above are only illustrative. For example, the division of units is only a logical function division. In actual implementation, there may be other division methods, such as: multiple units or components can be combined or integrated into another system, or some features may be ignored, or not implemented. In addition, the coupling, or direct coupling, or communication connection between the components shown or discussed may be through some interfaces, and the indirect coupling or communication connection of the devices or units may be electrical, mechanical, or in another form.

The units described above as separate components may or may not be physically separated, and the components displayed as units may or may not be physical units. They may be located in one place or distributed to multiple network units. Part or all of the units can be selected according to actual needs to achieve the objective of the technical solution of the embodiments of the present disclosure.

In addition, each functional unit in the embodiments of the present disclosure may be integrated into one processing unit, or each functional unit may be used as one single unit, or two or more units may be integrated into one unit. The above-described integration of the units may be realized in the form of hardware or in the form of hardware plus software functional units.

Those of ordinary skill in the art should understand that all or part of the processes to realize the above-described method embodiments may be completed by hardware executing program instructions, and the program instructions may be stored in computer-readable storage media. When being executed by a processor, the program instructions implement the processes of the above-described method embodiments. The computer-readable storage medium includes: various media capable of storing program codes such as a removable storage device, a read-only memory (ROM), a magnetic disk, or an optical disk.

Alternatively, if the above-described integrated units of the present disclosure are realized in the form of software function modules and sold or used as standalone products, they can also be stored in the computer-readable storage medium. Based on this understanding, the technical solutions of the embodiments of the present disclosure or the part that contributes to the prior art can be embodied in the form of a software product. The computer software product is stored in the computer-readable storage medium and includes program instructions for causing a computer device (which may be a personal computer, a server, or a network device, etc.) to execute all or part of the remote-control methods in various embodiments of the present disclosure. The computer-readable storage medium includes various media capable of storing program codes such as removable storage devices, ROMs, magnetic disks or optical disks.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. An image capturing method, comprising:
   obtaining a plurality of buffer queues;
   after the plurality of buffer queues are obtained, in response to an obtained shooting command, determining a target image frame corresponding to a moment when the shooting command is obtained from the plurality of buffer queues; and
   saving the target image frame as a photo;
   wherein each of the plurality of buffer queues includes image frames obtained at different moments and corresponding to different exposures, a plurality of image frames obtained at a same moment are respectively located in different ones of the plurality of buffer queues, and values of target acquisition parameters of the plurality of image frames obtained at the same moment are different to cause exposures of the plurality of image frames obtained at the same moment to be same.

2. The image capturing method according to claim 1, wherein:
   the plurality of image frames obtained at the same moment are generated by a camera module, wherein the camera module includes an image sensor, a photosensitive array of the image sensor includes a plurality of pixel groups, pixel units in each pixel group sense light of a same color, each pixel group includes a plurality of pixel units, and adjacent pixel groups sense light of different colors.

3. The image capturing method according to claim 2, wherein:
   each of the plurality of image frames obtained at the same moment is generated using photosensitive data of corresponding pixel units in the plurality of pixel groups in the photosensitive array.

4. The image capturing method according to claim 1, wherein:
   the target acquisition parameters of the plurality of image frames obtained at the same moment include at least one of a shutter speed or a sensitivity.

5. The image capturing method according to claim 1, wherein:
   the plurality of buffer queues include a reference queue, a value of a reference acquisition parameter is determined based on an exposure time and a mapping relationship at different moments in the reference queue, and the values of the target acquisition parameters at the same moment in the plurality of buffer queues are determined based on the value of the reference acquisition parameter; and
   the image capturing method further includes:
      determining the value of the reference acquisition parameter based on preview images buffered in a preview queue;
      determining different target values of the target acquisition parameters based on the values of the reference acquisition parameters; and
      configuring a camera module based on the different target values, such that each of the plurality of buffer queues buffers one of the plurality of image frames obtained at the same moment, display effects of the plurality of image frames obtained at the same moment being different.

6. The image capturing method according to claim 5, wherein determining the target image frame corresponding to the moment when the shooting command is obtained from the plurality of buffer queues includes:
   selecting a target queue; and
   determining the image frame in the target queue corresponding to the moment when the shooting command is obtained as the target image frame.

7. The image capturing method according to claim 6, wherein:
   a display effect of the target image frame in the target queue is better than that of a preview image at the same moment in the preview queue; and
   an action of a target object in the target image frame in the target queue is the same as an action of the target object in the preview image at the same moment in the preview queue.

8. An image capturing apparatus, comprising:
   a memory storing program instructions; and
   a processor coupled to the memory;
   wherein when being executed by the processor, the program instructions cause the processor to:
      obtain a plurality of buffer queues;
      after the plurality of buffer queues are obtained, in response to an obtained shooting command, determine a target image frame corresponding to a moment when the shooting command is obtained from the plurality of buffer queues; and
      save the target image frame as a photo;

wherein each of the plurality of buffer queues includes image frames obtained at different moments and corresponding to different exposures, a plurality of image frames obtained at a same moment are respectively located in different ones of the plurality of buffer queues, and values of target acquisition parameters of the plurality of image frames obtained at the same moment are different to cause exposures of the plurality of image frames obtained at the same moment to be same.

9. The image capturing apparatus according to claim 8, wherein:
the plurality of image frames obtained at the same moment are generated by a camera module, wherein the camera module includes an image sensor, a photosensitive array of the image sensor includes a plurality of pixel groups, pixel units in each pixel group sense light of a same color, each pixel group includes a plurality of pixel units, and adjacent pixel groups sense light of different colors.

10. The image capturing apparatus according to claim 9, wherein:
each of the plurality of image frames obtained at the same moment is generated using photosensitive data of corresponding pixel units in the plurality of pixel groups in the photosensitive array.

11. The image capturing apparatus according to claim 8, wherein:
the target acquisition parameters of the plurality of image frames obtained at the same moment include at least one of a shutter speed or a sensitivity.

12. The image capturing apparatus according to claim 8, wherein:
the plurality of buffer queues include a reference queue, a value of a reference acquisition parameter is determined based on an exposure time and a mapping relationship at different moments in the reference queue, and the values of the target acquisition parameters at the same moment in the plurality of buffer queues are determined based on the value of the reference acquisition parameter; and
the processor is further configured to:
  determine the value of the reference acquisition parameter based on preview images buffered in a preview queue;
  determine different target values of the target acquisition parameters based on the values of the reference acquisition parameters; and
  configure a camera module based on the different target values, such that each of the plurality of buffer queues buffers one of the plurality of image frames obtained at the same moment, display effects of the plurality of image frames obtained at the same moment being different.

13. The image capturing apparatus according to claim 12, wherein when determining the target image frame corresponding to the moment when the shooting command is obtained from the plurality of buffer queues, the processor is further configured to:
select a target queue; and
determine the image frame in the target queue corresponding to the moment when the shooting command is obtained as the target image frame.

14. The image capturing apparatus according to claim 13, wherein:

a display effect of the target image frame in the target queue is better than that of a preview image at the same moment in the preview queue; and
an action of a target object in the target image frame in the target queue is the same as an action of the target object in the preview image at the same moment in the preview queue.

15. A computer-readable storage medium storing a computer program, wherein when being executed by a processor, the computer program causes the processor to:
in response to an obtained shooting command, determine a target image frame corresponding to a moment when the shooting command is obtained in a buffer queue wherein the buffer queue includes images frames obtained at different moments with different exposures, a plurality of image frames obtained at a same moment with a same exposure are respectively located in different buffer queues; and values of target acquisition parameters of the plurality of image frames obtained at the same moment are different, the different buffer queues include a reference queue, a value of a reference acquisition parameter is determined based on an exposure time and a mapping relationship at different moments in the reference queue, and the values of the target acquisition parameters at the same moment in the different buffer queues are determined based on the value of the reference acquisition parameter;
determine the value of the reference acquisition parameter based on preview images buffered in a preview queue;
determine different target values of the target acquisition parameters based on the values of the reference acquisition parameters;
configure a camera module based on the different target values, such that each of the buffer queues buffers the image frames at the same moment, display effects of the image frames at the same moment being different; and
save the target image frame as a photo.

16. The computer-readable storage medium according to claim 15, wherein:
the plurality of image frames obtained at the same moment with the same exposure are generated by the camera module, wherein the camera module includes an image sensor, a photosensitive array of the image sensor includes a plurality of pixel groups, pixel units in each pixel group sense light of a same color, each pixel group includes a plurality of pixel units, and adjacent pixel groups sense light of different colors.

17. The computer-readable storage medium according to claim 16, wherein:
each of the plurality of image frames obtained at the same moment with the same exposure is generated using photosensitive data of corresponding pixel units in the plurality of pixel groups in the photosensitive array.

18. The computer-readable storage medium according to claim 15, wherein:
the target acquisition parameters of the plurality of image frames obtained at the same moment include at least one of a shutter speed or a sensitivity.

19. The computer-readable storage medium according to claim 15, wherein when determining the target image frame corresponding to the moment when the shooting command is obtained in the buffer queue, the processor is further configured to:
select a target queue; and determine the image frame in the target queue corresponding to the moment when the shooting command is obtained as the target image frame.

* * * * *